(No Model.)

D. R. LIVENGOOD.
DISK HARROW.

No. 603,449. Patented May 3, 1898.

WITNESSES:

INVENTOR
D. R. Livengood
BY
ATTORNEYS

UNITED STATES PATENT OFFICE.

DAVID R. LIVENGOOD, OF TACITUS, TEXAS.

DISK HARROW.

SPECIFICATION forming part of Letters Patent No. 603,449, dated May 3, 1898.

Application filed July 8, 1897. Serial No. 643,814. (No model.)

*To all whom it may concern:*

Be it known that I, DAVID R. LIVENGOOD, of Tacitus, in the county of Haskell and State of Texas, have invented certain new and useful Improvements in Disk Harrows, of which the following is a specification.

My invention relates to improvements in disk harrows, and especially refers to certain attachments adapted to be secured to the tongue of the harrow, which will serve to support the tongue and doubletree and keep them from dropping to the ground when the harrow is at rest.

My invention consists in the peculiar combination and novel arrangement of parts, such as will be first described in detail and then be specifically pointed out in the appended claims, reference being had to the accompanying drawings, in which—

Figure 1:
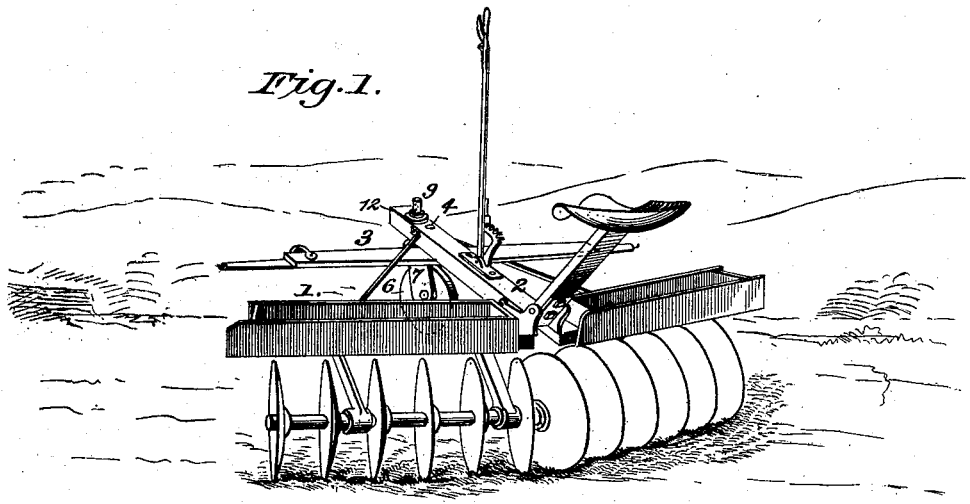
Figure 2:
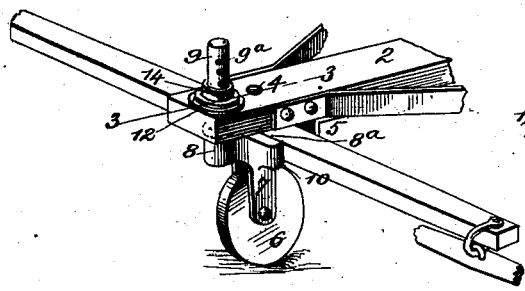
Figure 3:
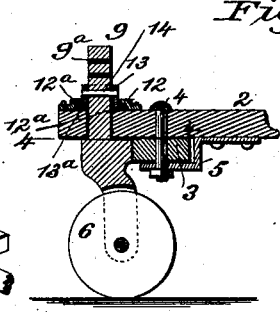
Figure 4:
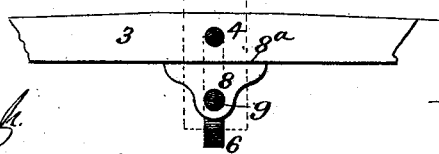

Figure 1 is a view of the disk harrow with my improvement applied. Fig. 2 is a detail view of one end of the harrow-tongue with my improvements applied. Fig. 3 is a longitudinal section taken on the line 3 3 of Fig. 2, and Fig. 4 is a horizontal section taken on the line 4 4 of Fig. 3.

In its practical application my invention embodies a supporting or caster wheel which is adapted to be secured to the tongue of the harrow at a point just in advance of the doubletree, and when used in connection with the harrow the tongue of such harrow is cut off at a point just in advance of the caster-wheel bearing, whereby to render the harrow practically a tongueless one.

Referring to the accompanying drawings by numerals, in which like numerals indicate like parts in all the figures, 1 indicates the harrow, which may be made of any approved construction, and 2 indicates the harrow-tongue, which, as will be noticed more particularly by reference to Fig. 1, is cut off at a point slightly in advance of the doubletree 3, which is pivotally secured to the under side of the tongue by a pivot-bolt 4 and held in position by a bracket 5.

6 indicates a caster-wheel which is journaled in bifurcated ends 7 of the pendent bracket 8, which has a vertical shank 9, provided with a series of apertures 9$^a$. The body of the caster-wheel-holder bracket is extended laterally to form bearing portions 10, the purpose of which will be presently explained.

The caster-wheel holder is adjustably connected with the tongue 2, and its shank is extended and provided with a series of apertures, so it can be adjustably connected to tongues of different heights, whereby the wheel can be set so as to just barely tip the ground during the operation of the harrow, and for this purpose and to provide a fixed bearing for the rotation of the caster-wheel shank when properly adjusted in position a keeper 12 is secured upon the upper faces of the tongue 2, which has an undercut annular space 12$^a$ to receive the annular rim 13$^a$ of the sleeve 13, which is fixedly held on the shank 9 by the pin 14, which passes therethrough and through any one of the apertures in the said shank, as clearly shown in Fig. 3.

In practice the caster-supporting frame is journaled on the tongue at a point just in advance of the doubletree 3, so that the front edge of such doubletree will bear against the inner face 8$^a$ of the bracket-body, whereby such doubletree will be held to move in unison with the said body as the caster-wheel turns awry, as the harrow is drawn over the field, such arrangement of parts being provided to especially prevent the ends of the doubletree from moving too freely, and thereby keep them from hitting the heels of the team as the machine travels across the field, it being obvious that as the doubletree and the body of the caster-holder are held in contact and as they move together it will be impossible for such doubletree to have a tilting or too free movement on its pivot-bolt.

From the foregoing description, taken in connection with the accompanying drawings, it will be observed that by applying my improvements to a harrow-tongue no especial changing of the harrow is required further than cutting off the tongue at a point just in advance of the doubletree, thereby making the harrow a tongueless one. As the caster or supporting wheel is capable of being vertically adjusted and held for free rotary movement, it is obvious that the same can be secured to harrow-tongues having different elevations from the ground. Furthermore, in case the harrow is held from operation the tongue, with the doubletree, will be supported and held from dropping to the ground, and by arranging the caster-wheel body in close relation to the doubletree, so that the two must move together, the movement of the caster-wheel will be always regular in the direction of the draft and the tongue will be held positively from engaging the heels of the team.

In applying my improvement to the tongue of the harrow the keeper 12 is secured to the top of the harrow and a shank adjusted in the sleeve 13 to the proper height before the securing-pin is placed in position.

By providing a keeper and sleeve, such as shown, a simple means for adapting the shank of the caster-holder to the tongue is produced.

My improvement comprises a very few parts, is of a very simple nature, can be readily adapted to any harrow-tongue, and will effectively serve for its intended purposes.

Having thus described my invention, what I claim, and desire to secure by Letters Patent, is—

1. The combination with the harrow-tongue and the doubletree pivotally secured thereto, of a caster-wheel secured to the tongue at a point in advance of the doubletree, said wheel having a bearing-face adapted to engage the front face of the doubletree, substantially as shown and described.

2. The combination with the tongue and the doubletree, of the caster-wheel and a supporting-bracket, said bracket having a shank provided with a series of apertures vertically adjustable in the tongue at the point in front of the doubletree, said bracket having inner faces held to bear against the front face of the doubletree, a retaining-pin 14, all being arranged substantially as shown and for the purposes described.

DAVID R. LIVENGOOD.

Witnesses:
J. W. EVANS,
A. C. FOSTER.